United States Patent [19]

Gorga

[11] 4,430,667
[45] Feb. 7, 1984

[54] APPARATUS FOR OBTAINING MULTICOLOR RASTER IMAGES USING A VOLTAGE PENETRATION SCREEN CRT

[75] Inventor: Kevin J. Gorga, Endwell, N.Y.

[73] Assignee: International Business Machines Corporation, Armonk, N.Y.

[21] Appl. No.: 336,799

[22] Filed: Jan. 4, 1982

[51] Int. Cl.³ .................. H04N 9/27; H01J 29/80
[52] U.S. Cl. ........................ 358/73; 315/375
[58] Field of Search .............. 358/71, 72, 73, 74; 315/1, 13 CG, 5.41, 5.42, 375, 395, 391, 368

[56] References Cited

U.S. PATENT DOCUMENTS

| | | | |
|---|---|---|---|
| 3,204,143 | 8/1965 | Pritchard | 315/13 |
| 3,424,940 | 1/1969 | Foote | 315/395 |
| 3,478,245 | 11/1969 | Barkow | 315/13 |
| 3,522,370 | 7/1970 | Jones et al. | 178/5.4 |
| 3,840,773 | 10/1974 | Hart | 315/29 |
| 4,092,566 | 5/1978 | Chambers et al. | 313/375 |
| 4,099,088 | 7/1978 | Hart | 315/450 |
| 4,151,444 | 4/1979 | Jenness | 315/1 |
| 4,203,055 | 5/1980 | Chambers et al. | 315/375 |
| 4,223,252 | 9/1980 | Doran | 315/375 |
| 4,281,272 | 7/1981 | Spilsbury | 315/1 |
| 4,284,928 | 8/1981 | Ragot | 315/375 |

Primary Examiner—Tommy P. Chin
Attorney, Agent, or Firm—Saul A. Seinberg

[57] ABSTRACT

A color display system that employs a penetration type CRT, a control circuit and storage elements for holding the information to be displayed to obtain multicolored rastered images is described. The CRT is capable of exhibiting a predetermined number of colors. The storage elements hold information that defines one frame for each displayable CRT color screen. The control circuit supplies appropriate video and drive signals for each color frame to be displayed, at the proper time and sequence, to the CRT. In particular, the control circuit is adapted to provide drive signals for horizontal and vertical electron beam deflection circuits that cause the beam to be scanned, both horizontally and vertically, at a rate that is a multiple of the predetermined number of colors to be displayed and the conventional scan rate for horizontal and vertical deflection. Thus, the predetermined number of frames will be overlaid, relying on the persistence of the CRT screen phosphor composite, to form one user perceived multicolor, flicker-free screenfull of information.

8 Claims, 5 Drawing Figures

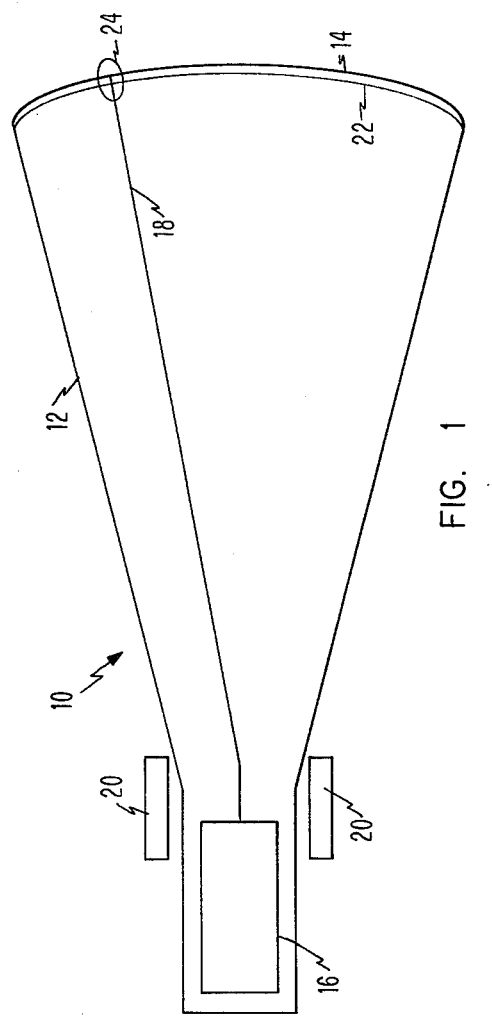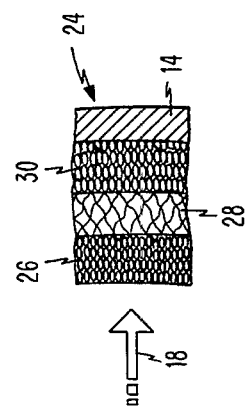
FIG. 1
FIG. 2

APPARATUS FOR OBTAINING MULTICOLOR RASTER IMAGES USING A VOLTAGE PENETRATION SCREEN CRT

BACKGROUND OF THE INVENTION

1. Field of the Invention

This invention is concerned with apparatus that permits utilization of a voltage penetration screen CRT as a rastered, multicolor device. More particularly, this invention is concerned with employing a voltage penetration CRT to obtain, at least, limited multicolor rastered images without the use of convergence or alignment electronics.

2. Description of the Prior Art

Voltage penetration screen cathode ray tubes, or CRTs, having a single electron gun, are well known in art. Such CRTs, since they have only one electron beam to scan, have no need for and, therefore, do not use either the alignment or convergence electronics that are necessary in conventional three gun color systems. Typically, their screen receives a multiple layer phosphor coating that enables a cathode ray tube with a single electron gun to display information in up to four colors. The actual color that is displayed will depend upon the amplitude of the beam accelerating voltage employed. The overall quality of the display has resolution comparable to that of a high quality monochrome tube employing conventional raster or scanning techniques. The data is screen displayed by what has been variously termed random scan, x-y writing or stroke writing. As these names imply, the data is written to the screen by precisely deflecting the CRT beam to predefined locations and not, as in conventional monitors or displays, by sweeping the beam across the screen.

One significant problem that this type of CRT has had is that of switching the rather high electron beam accelerating voltages quickly enough during vertical retrace to obtain a rapid change in color. That type of problem has been addressed by solutions of the type proposed in U.S. Pat. Nos. 4,092,566 and 4,203,055, both of which were issued to Chambers et al, and are concerned with rapid switching high voltage power supplies for a beam penetration color CRT. Thus, the problems related to the rapid switching of relatively high voltage levels to obtain quick color changes were soon solved and the penetration screen type of CRT became rather popular for certain uses.

This type of CRT has proven useful, for example, in applications ranging from air traffic control and cockpit displays to industrial process control and public utility power dispatching. It has been found that the colors used in these displays, the phosphor composites of which are selected to eliminate blue, closely match the spectral response of the human eye and allow extended viewing with greatly reduced visual fatigue.

However, there were some situations in which this type of CRT could not be effectively employed. In particular, a use limitation was brought about in the situation where the amount of information to be written to a screen was too great to be written before the screen had to be refreshed. In such a situation, some material placed on the screen began to or actually did fade before refresh could be accomplished. When the screen was subsequently refreshed, the tardy replacement or overwriting of this information made the screen images appear to flicker.

The use of high or, more accurately, longer persistent phosphors minimized the flicker problem since it now took longer for a screen image to fade. However, these phosphors were more expensive than the ordinary composites and suitable only for limited use. Furthermore, their use negated the economic advantages of employing the penetration screen type of CRT which allowed the designer to avoid convergence and alignment electronics and reap the savings attendant thereto. In addition, the emergence of low end or microprocessor based computing systems fueled a need for an economic and relatively high resolution multicolor CRT display that conventional shadow mask CRTs could not fulfill. While the penetration screen CRT seemed to promise an ability to satisfy that need, its inability to economically provide flicker-free displays of crowded screens had to be overcome.

OBJECTS AND SUMMARY OF THE INVENTION

Accordingly, it is a principal object of the present invention to provide apparatus that incorporates a penetration type CRT to obtain multicolor rastered images without the use of convergence or alignment electronics.

It is also a principal object of the present invention to provide such CRT apparatus that will be essentially flicker free while still able to provide crowded screens of information.

It is another object of the present invention to provide multicolor CRT apparatus that is economical to both fabricate and operate.

These and other objects of the present invention are realized by utilizing a penetration type CRT, which is to exhibit a predetermined number of colors, in conjunction with storage means for holding information defining one frame for such color to be displayed on the CRT screen and control means for supplying the appropriate video and drive signals for each color frame to be displayed, at the proper time and in the appropriate order, to the CRT. The control means is further adapted to provide drive signals for horizontal and vertical deflection electron beam circuit means that will cause the beam to be scanned, both horizontally and vertically, at a rate that is a multiple of the predetermined number of colors to be displayed and the conventional scan rate for each. Thus, there will be a predetermined number of frames overlaid, relying on the persistence of the CRT screen phosphor composite, to form one user perceived, flicker-free screenfull of information.

BRIEF DESCRIPTION OF THE DRAWINGS

The invention will be described further, by way of preferred example, with reference to the accompanying drawings wherein:

FIG. 1 schematically illustrates a penetration screen type of CRT and the principal elements thereof;

FIG. 2 schematically depicts, in expanded size, the phosphor composite and screen support therefor used in the CRT shown in FIG. 1;

DESCRIPTION OF THE PREFERRED EMBODIMENT

Figure 3:
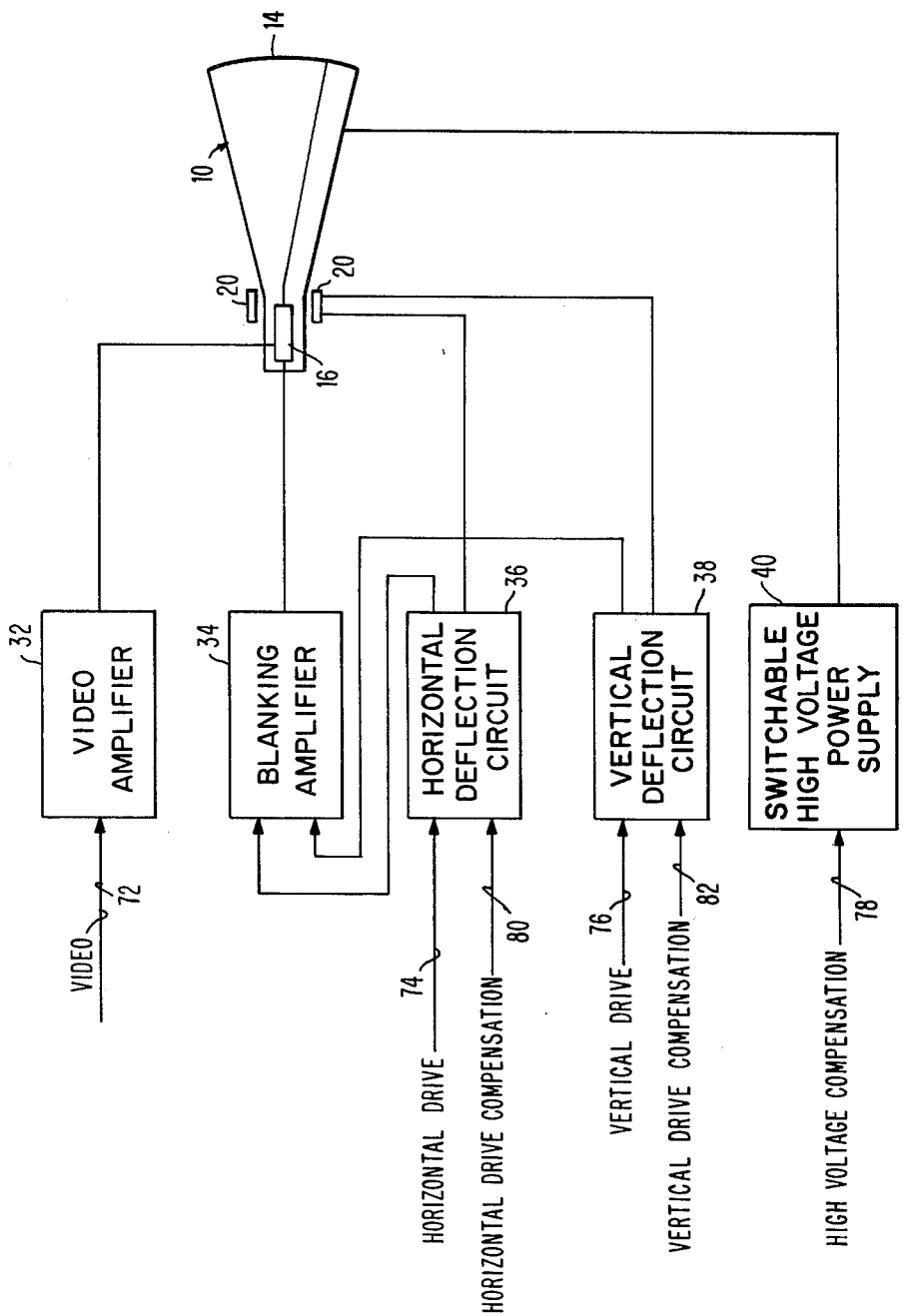
FIG. 3 shows a block diagram of typical CRT support circuitry that could be used to operate a CRT of the type shown in FIG. 1.

Referring now to the drawings wherein like reference numerals have been used in the several views thereof to identify like elements, FIG. 1 schematically illustrates the operating principles of a voltage penetration type of cathode ray tube 10. This CRT includes a glass envelope 12, having a faceplate or penetration screen 14. CRT 10 is provided with an electron gun 16, which generates an electron beam 18, and deflection means 20 which are conventionally employed to both horizontally and vertically deflect the beam 18 across the face of screen 14. The inner surface of screen 14 is covered with a multilayer phosphor composite coating 22 that is impinged by the beam 18 at whatever points data is to be written to the screen 14.

As indicated in FIG. 1, and as shown in greater detail in FIG. 2, the electron beam 18 strikes the screen 14 at point 24. It is assumed that a red-green P49 phosphor composite, commercially available from DuMont Corporation, has been used to coat the screen 14. With this phosphor, the electron beam 18, at a low acceleration voltage of 10 kV (kilovolts), will only be able to activate the red phosphor layer 26 thereof. That is, the screen 14 will exhibit a red dot at all points of beam impingement thereon. At a higher accelerating voltage of 18 kV, the electron beam 18 will penetrate the dielectric barrier 28 and completely activate the green phosphor layer 30 at the point of beam impact to an intensity sufficient to overcome the effect of the activated red phosphor layer 26. In other words, at an accelerating voltage of 18 kV, the screen 14 will show a green dot at all points of beam impact. At intermediate beam accelerating voltages, the red and green luminances are not completely cancelled and mix to produce yellow or orange, in accordance with the response reactions of the particular phosphor composite that has been used on the screen surface.

The present invention permits the use of a conventional penetration screen type of CRT, even where writing of crowded screens may occur. This is accomplished by providing conventional CRT support electronics and operating the penetration screen CRT in a raster mode, but at scan rates that are a multiple of the standard rate and the number of colors that are to be shown on the screen. A block diagram of the principal and typical CRT support electronics is shown in FIG. 3. These support electronics include, but are not limited to, a video signal amplifying circuit 32, a blanking signal amplifying circuit 34, a horizontal drive circuit 36, a vertical drive circuit 38, and a high voltage power supply 40.

Figure 5:
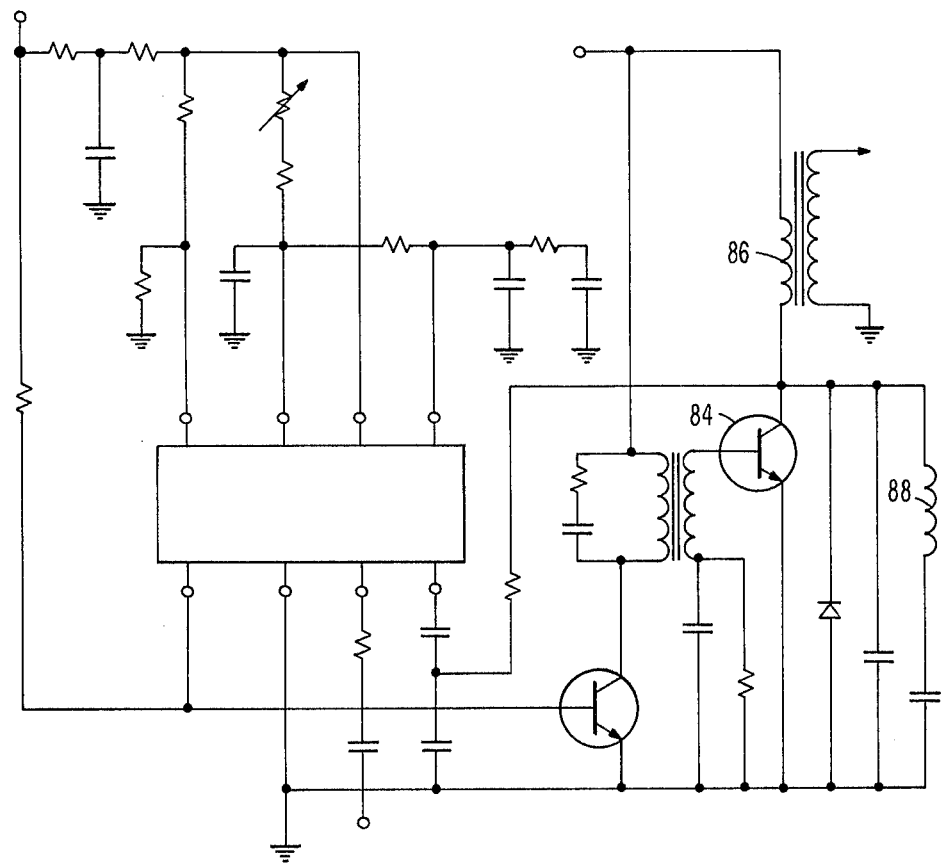
FIG. 5 illustrates a typical television or CRT horizontal drive or deflection circuit that is employable in conjunction with the present invention.

The video amplifying circuit 32 provides the video signal to CRT 10. The blanking amplifying circuit 34 serves to provide blanking pulses to CRT 10 that cut off the video signal during both horizontal and vertical retrace. The horizontal and vertical deflection circuits, 36 and 38 respectively, are responsible for scanning the electron beam 18 both horizontally and vertically across the CRT screen 14. A typical horizontal drive circuit is shown in FIG. 5. The high voltage power supply 40 provides a switchable source of several levels of electron beam accelerating voltages. It must be capable of being rapidly switched during vertical retrace between the maximum difference in accelerating voltage levels associated with the available CRT colors. Either of the switchable high voltage power supplies described in the aforementioned Chambers et al patents could be employed herein as the switchable power supply 40.

It is therefore intended that one frame of information be displayed for each color that it will be possible to display and that the scan rates be adjusted accordingly. Thus, for a three color rastered penetration screen display, the horizontal scan rate is adjusted from a conventional 15,750 hertz (hz) to a rate of 47,250 hz, a resultant rate that is the product of the conventional CRT horizontal scan rate and the number of possible colors to be displayed. Similarly, the new vertical scan rate is set to 180 hz or three times the conventional vertical scan rate of 60 hz. In a four color display system, the horizontal and vertical scan rates would be 63,000 and 240 hz, respectively.

This change in scanning rate will not cause any problems in the typical vertical deflection circuits found in current use. However, in a typical current use horizontal deflection circuit, the scan rate increase will be of concern. Switching transistor 84, see FIG. 5 which shows such a typical horizontal deflection circuit, is used to switch the horizontal deflection voltage on and off at the proper time in accordance with predetermined circuit requirements. When transistor 84 is, in particular, turned off at the end of retrace, it must be able to cope with the voltage that is generated by the collapsing fields of flyback transformer winding 86 and deflection yoke winding 88. Because of the shortened retrace times resulting from the faster horizontal scans, the magnitude of the induced voltage, which is indirectly proportional to the retrace time, is significantly increased. It is, therefore, suggested that transistor 84 be selected to withstand the higher breakdown voltages that will be encountered in such use. A Motorola Corporation MJ12005 is deemed suitable for this purpose.

Figure 4:
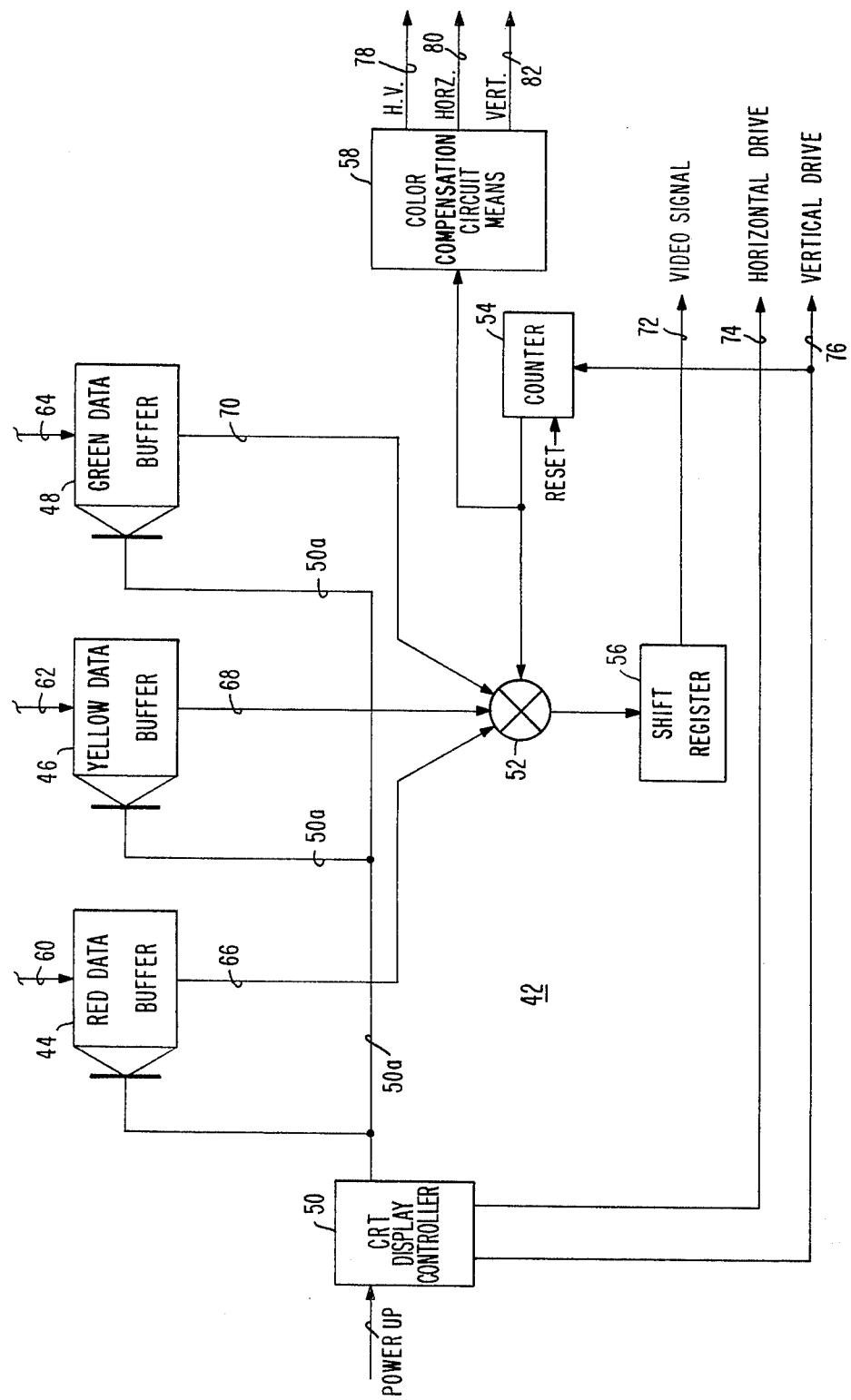
FIG. 4 depicts a block diagram of control functions and circuitry used, in accordance with the present invention, to operate the FIG. 1 CRT in a multi-frame, raster mode.

The present invention also requires the use of certain control functions and supporting circuitry therefor which is illustrated in FIG. 4. This is provided by storage means 44, 46 and 48, a CRT Graphics Display Controller 50, signal sequencing device 52, a counter 54, a shift register 56 and a compensation circuit 58. Assuming again that a CRT having a red-green phosphor composite is to be used and that three colors (red, green and yellow) are displayable, the present invention will operate in the following manner.

Referring now to FIG. 4 which illustrates the control circuit means 42 of the present invention, there is shown storage color information buffers 44, 46 and 48. One buffer is provided for each of the three colors that could be displayed. Each buffer is sized to hold one complete frame of information for a particular display color. Thus, at any given time except replenishment, the three color buffers will be holding respectively, all of the red, yellow and green information required for a particular composite user screen of information in which the three color frames are perceived to be simultaneously displayed. In this example, buffer 44 has been designated to hold a full frame of the red information that is to be shown on the screen, buffer 46 will hold a full frame of the yellow information and buffer 48 will hold a full frame of the green information that is to be displayed. The information held by these buffers is expected to be in digital form and will be supplied from any suitable and appropriate source (not shown), one complete screenfull at a time.

The bulk of the control responsibility is shouldered by a Graphics Display Controller or GDC chip 50 which is designed with CRT control in mind. There are several commercially available GDC chips, one suitable controller being a Nippon Electric Corporation (NEC) No. 7220 integrated circuit chip. On "power-up" or as it deems necessary, an information source (not shown) forwards information for a new or fresh screen to the color buffers. That information is thereafter read, in a predetermined order, from the color buffers 44, 46 and 48 to the shift register 56, as shall hereinafter explained. Unless new screen data is sent, the control circuit means 42 continues to cause repetition of the frame display cycle for the current screen. The buffers receive data from the information source via buffer input lines 52, 54 and 56 and forward the same to sequencer 52 and to shift register 56, via their output lines 66, 68 and 70, respectively.

Once the color buffers have received screen information, the controller 50 gates red frame data, now resident in buffer 44, to sequencer 52 on buffer output line 66. This is done by directing the controller read command output line 50a to read selectable and identified portions of buffer 44 onto its output line 66. This passes a part of the red frame data to sequencer 52, with the remainder being sent as directed from other buffer memory 44 locations, as selected and identified by read command line 50a. Sequencer 52 then forwards the information it has received to shift register 56. Sequencer 52 is adapted to receive information from the color buffers, but only in the prescribed order of red, yellow and then green, in this case. Controller 50 also develops the horizontal and vertical drive signals for the CRT's electron beam and forwards these signals on its output lines 74 and 76 respectively. It will be understood by those having skill in this art that, the order in which the color frame data is read from the buffers need not be in the particular sequence specified above. However, the order that is selected is best maintained throughout the operation of the present invention.

Counter 54 is set to zero on "power-up" and can count up to a maximum of the predetermined number of displayable colors, three in this instance, before being reset. The input of counter 54 is connected to receive the vertical drive pulse signals from output line 76. Each time that a vertical drive pulse is received, it means that one complete frame has been scanned onto the CRT screen by the beam and that the CRT 10 is ready to accept the next color frame for display. When this happens, counter 54 is incremented by a count of one, notifying sequencer 52 and responsively causing data for the next frame of information, to be routed via an appropriate buffer output line, to shift register 56 and, from there, to the video signal line 72.

Thus, after "power-up", the red frame information is shifted from buffer 44 to sequencer 52 and shift register 56 before being displayed. At the end of beam scan for the red frame, counter 54 is incremented and sequencer 52 is thereby caused to forward the yellow frame of information to shift register 62, via buffer output line 68, before it is displayed. The green frame of information is similarly displayed in response to the counter being incremented to a count of two, the data being read from buffer 48 onto output line 70 thereof befor being passed to the sequencer 52 and shift register 56. After the green frame data has been displayed, counter 54 is reset to zero by the next vertical drive pulse and the red frame data is again read from buffer 44 to refresh the entire screen; unless new screen data has been sent from the information source. Controller 50, which issues the vertical drive pulses, knows therefrom when to send the reset signal to counter 54. Reset could also be performed during any particular sequence should that be necessary.

The control circuit means 42 also includes color compensation circuit means 58 that serves to advise the horizontal and vertical deflection circuits 36 and 38, as well as the high voltage power supply 40, that a new color frame is to be displayed. As noted previously, each displayed color requires that the beam accelerating voltage be adjusted to a level appropriate for the display of that color. In this instance, this means that when counter 54 is set to zero, the color compensation circuit means 56 is advised that the red frame is to be written next. The high voltage power supply 40 is then sent a signal which drives its output beam accelerating voltage to the proper level to achieve red display. Simultaneously, the horizontal and vertical deflection circuits 36 and 38 are conditioned to provide output signals of sufficient strength to deflect an electron beam that has been so accelerated. When the red frame scan is completed, the ensuing vertical drive pulse increments counter 54 and causes the necessary information therefor to be sent from color buffer 46 to sequencer 52. The counter incrementation also causes the color compensation circuit means 56 to set the output of the high voltage power supply 40 to an appropriate level for yellow and also adjust the deflection voltages to the values that are needed to manipulate an electron beam that has been accelerated to produce that screen color. The vertical drive pulse which signals the end of the yellow frame scan and increments counter 54 to its maximum value, similarly adjusts the high voltage power supply 40 and the deflection circuits 36 and 38 to levels that are suitable for the display of the green data frame.

The foregoing description has been speifically directed to a situation where a penetration type of CRT is employed to obtain multicolor rastered images. However, while the present invention has been described in the context of a preferred embodiment thereof, it will be readily apparent to those skilled in the appertaining art, that modifications and variations can be made therein without departing from its spirit and scope. Accordingly, it is not intended that the present invention be limited to the specifics of the foregoing description of the preferred embodiment. Instead, the present invention should be considered as being limited solely by the appended claims, which alone are intended to define its scope.

Having thus described my invention, what I claim as new and desire to secure by Letters Patent, is as follows:

1. Apparatus for causing a beam penetration color cathode ray tube, having horizontal and vertical deflection means for scanning the beam thereof across the face of said tube at predetermined horizontal and vertical scan rates and a phosphor composite coated screen that emits light which changes color as a function of the accelerating voltage applied to the impinging beam thereof, to exhibit video information in a predetermined number of displayable colors, said apparatus comprising:

(a) video amplifying means, connected between a source of video information and said cathode ray tube, for increasing a received video signal to sufficient levels for the display thereof;

(b) horizontal scan circuit means, connected to said horizontal deflection means, for causing the rate of horizontal scanning of said electron beam to be a multiple of its predetermined rate and said predetermined number of colors to be exhibited;

(c) vertical scan circuit means, connected to said vertical deflection means, for causing the rate of vertical scanning of said electron beam to be a multiple of its predetermined rate and said predetermined number of colors to be exhibited;

(d) power supply circuit means, connected to said cathode ray tube, for providing an accelerating voltage for said beam thereof for each of said predetermined number of displayable colors to be exhibited, said power supply accelerating voltage being switchable to and between the different levels necessary to achieve the different possible phosphor colors; and (e) control circuit means, connected to said horizontal scan circuit means, said vertical scan circuit means and said power supply circuit means, for supplying horizontal and vertical drive pulse signals for said horizontal and vertical scan circuit means and for determining when, in response to scan completions, said power supply circuit means is to be switched and to what accelerating voltage level and for then causing the same to occur.

2. The apparatus according to claim 1 wherein said control circuit means includes color compensation circuit means, connected to said horizontal scan circuit means, said vertical scan circuit means and said power supply circuit means, for providing an indication thereto of the electron beam accelerating voltage needed to display any particular one of said displayable colors and of the deflection voltages required to scan said beam at that accelerating voltage.

3. The apparatus according to claim 2 wherein said control circuit means includes storage means, connected between said source of information and said video amplifier means, for storing information for a predetermined number of screen frames, said number of frames being equal to said predetermined number of displayable colors.

4. The apparatus according to claim 3 wherein said control circuit means includes sequencing circuit means, connected between said storage means and said video amplifier means, for sequencing data from said storage means to said video amplifying in a predetermined order.

5. The apparatus according to claim 4 wherein said storage means includes a plurality of separately addressable buffer memories, one for each color that can be displayed, and said sequencing circuit means includes:

(a) a counter, connected to receive said vertical voltage drive pulses, for generating an outputs pulse each time it is incremented thereby;

(b) a switchable data sequencing device, connected to receive the output of said buffer memories and said counter, for routing data from one of said buffer memories in prescribed order and, responsive to receipt of a count signal from said counter, for switching to route the next succeeding buffer memory output; and (c) a shift register, connected between said data sequencing device and said video amplifying means, for receiving data for each color frame that can be clocked out to said video amplifying means for subsequent display.

6. The apparatus according to claim 1 wherein said control circuit means includes storage means, connected between said source of information and said video amplifier means, for storing information for a predetermined number of screen frames, said number of frames being equal to said predetermined number of displayable colors.

7. The apparatus according to claim 6 wherein said control circuit means includes sequencing circuit means, connected between said storage means and said video amplifier means, for sequencing data from said storage means to said video amplifying in a predetermined order.

8. The apparatus according to claim 7 wherein said storage means includes a plurality of separately addressable buffer memories, one for each color that can be displayed, and said sequencing circuit means includes:

(a) a counter, connected to receive said vertical voltage drive pulses, for generating an outputs pulse each time it is incremented thereby;

(b) a switchable data sequencing device, connected to receive the output of said buffer memories and said counter, for routing data from one of said buffer memories in prescribed order and, responsive to receipt of a count signal from said counter, for switching to route the next succeeding buffer memory output; and (c) a shift register, connected between said data sequencing device and said video amplifying means, for receiving data for each color frame that can be clocked out to said video amplifying means for subsequent display.

* * * * *